United States Patent [19]
Arimilli et al.

[11] Patent Number: 6,115,794
[45] Date of Patent: *Sep. 5, 2000

[54] METHOD AND SYSTEM OF PROVIDING A PSEUDO-PRECISE INCLUSIVITY SCHEME IN A SECTORED CACHE MEMORY FOR MAINTAINING CACHE COHERENCY WITHIN A DATA-PROCESSING SYSTEM

[75] Inventors: Ravi Kumar Arimilli, Austin; John Steven Dodson, Pflugerville, both of Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/839,544

[22] Filed: Apr. 14, 1997

[51] Int. Cl.$^7$ .............................. G06F 13/00; G06F 12/08
[52] U.S. Cl. ............................ 711/141; 711/122; 711/144
[58] Field of Search ................................ 711/3, 122, 205, 711/209, 119, 141, 144, 145, 128; 365/49

[56] References Cited

U.S. PATENT DOCUMENTS

| | | | |
|---|---|---|---|
| 3,733,589 | 5/1973 | Thompson | 340/173 |
| 5,530,832 | 6/1996 | So et al. | 395/449 |
| 5,584,013 | 12/1996 | Cheong et al. | 395/449 |
| 5,706,464 | 1/1998 | Moore et al. | 395/449 |
| 5,715,428 | 2/1998 | Wang et al. | 395/468 |
| 5,796,980 | 8/1998 | Bowles | 395/471 |
| 5,832,276 | 11/1998 | Feiste et al. | 395/728 |

*Primary Examiner*—John W. Cabeca
*Attorney, Agent, or Firm*—Richard A. Henkler; Mark E. McBurney; Felsman, Bradley, Vaden, Gunter & Dillion, LLP

[57] ABSTRACT

A method and system of providing a pseudo-precise inclusivity scheme in a sectored cache memory for maintaining cache coherency within a data-processing system is disclosed. In accordance with the method and system of the present invention, a cache memory includes a multiple of cache lines. The data field of the cache lines is divided into multiple sectors. A state-bit field is associated with each of the cache lines, and the state-bit field is utilized to identify at least four different states of the corresponding cache line. An inclusive-bit field is associated with each of the sectors within each cache lines, and the inclusive-bit field is utilized to identify an inclusivity state of an associated sector. A first of the four states is assigned to provide precise inclusivity states of an associated cache line. A second and a third of the four states is assigned to provide an imprecise inclusivity state of an associated cache line for improving cache line state decoding efficiency.

15 Claims, 3 Drawing Sheets

| CACHE LINE | STATE BITS | SECTOR 0 INCLUSIVITY BIT | SECTOR 1 INCLUSIVITY BIT |
|---|---|---|---|
| A | M | 0 | 1 |
| B | E | 0 | 0 |
| C | S | 1 | 1 |
| D | I | 0 | 1 |

| CACHE LINE | STATE BITS | SECTOR 0 INCLUSIVITY BIT | SECTOR 1 INCLUSIVITY BIT |
| --- | --- | --- | --- |
| A | M | 0 | 1 |
| B | E | 0 | 0 |
| C | S | 1 | 1 |
| D | I | 0 | 1 |

Fig. 3

METHOD AND SYSTEM OF PROVIDING A PSEUDO-PRECISE INCLUSIVITY SCHEME IN A SECTORED CACHE MEMORY FOR MAINTAINING CACHE COHERENCY WITHIN A DATA-PROCESSING SYSTEM

CROSS-REFERENCE TO A RELATED PATENT APPLICATION

The present invention is related to the subject matter of a co-pending United States Patent Application entitled "Method and System for Providing a Directory in a Sectored Cache Memory for Maintaining Cache Coherency Within a Data-Processing System," filed Mar. 31, 1997, Ser. No. 08/829,580 (IBM Docket No. AT9-97-143), and assigned to the assignee herein named. The content of the above-mentioned co-pending patent application is incorporated by reference herein.

BACKGROUND OF THE INVENTION

1. Technical Field

The present invention relates to a method and system for maintaining cache coherency in general and, in particular, to a method and system for maintaining cache coherency within a data-processing system. Still more particularly, the present invention relates to a method and system of providing a pseudo-precise inclusivity scheme in a sectored cache memory for maintaining cache coherency within a data-processing system.

2. Description of the Prior Art

A data-processing system typically includes a processor coupled to a variety of storage devices arranged in a hierarchical manner. Hardware and/or software can dynamically allocate parts of the storage devices within the hierarchy for addresses deemed most likely to be accessed soon. The type of storage employed in each hierarchical level relative to the processor normally is determined by balancing the requirements for speed, capacity, and costs.

In addition to a main memory, a commonly employed storage device in the hierarchy includes a high-speed memory known as a cache memory. A cache memory speeds the apparent access times of the relatively slower main memory by retaining the words that the processor most likely is to access again soon, and making the words available to the processor at a much lower latency. As such, cache memory enables relatively fast access to a subset of data and/or instructions that were recently transferred from the main memory to the processor, and thus improves the overall speed of the data-processing system.

A two-level cache memory hierarchy is a cache memory system consisting of two cache memories, each having a different size and speed. Typically, the first cache memory, commonly known as the primary cache or level one (L1) cache, has a faster access time and a higher cost per bit, while the second cache memory, commonly known as the secondary cache or level two (L2) cache, has a slower access time but also a lower cost per bit. In most cases, the smaller and faster primary cache is on-chip, while the larger and slower secondary cache is off-chip, although an on-chip secondary cache also is quite common in some high-performance processor designs nowadays.

In order to maintain a coherent memory system, the same copy of information must be provided to all memory devices within the memory hierarchy for allowing synchronization and cooperative usage of resource sharing. Otherwise, problems will occur when an old or stale copy of information is utilized inadvertently. Hence, under a scheme called inclusion, the primary cache normally is designed to always contain a subset of data stored in the secondary cache. This inclusion scheme provides a certain level of redundancy between the primary cache and the secondary cache so that the bus traffic to the primary cache may be reduced.

In addition, a common goal of any cache memory implementation is to minimize the amount of cache directory space required for a given-size cache memory. This typically is achieved by sectoring the cache memory such that each directory entry represents two or more cache sectors. A sectored cache memory performs bulk data transfers with a shared memory, but subdivides each receiving cache line into sectors of smaller units of data when sharing occurs.

Under the inclusion scheme mentioned above, a traditional sectored secondary cache utilizes one bit, commonly known as an inclusivity bit, per sector to indicate if that particular sector also is present in the primary cache. For example, a secondary cache having four sectors would take a total of four bits to define the inclusivity status of all four cache sectors. Despite the fact that the inclusion scheme under a traditional sectored cache presents a very accurate view of the inclusivity status of each sector, it is desirable to provide a pseudo inclusivity scheme that requires fewer directory bits and simplifies decoding, thus allowing for a smaller cache directory with higher operating frequencies.

SUMMARY OF THE INVENTION

In view of the foregoing, it is therefore an object of the present invention to provide an improved method and system for maintaining cache coherency.

It is another object of the present invention to provide an improved method and system for maintaining cache coherency within a data-processing system.

It is yet another object of the present invention to provide an improved method and system of providing a pseudo-precise inclusivity scheme in a sectored cache memory for maintaining cache coherency within a data-processing system.

In accordance with the method and system of the present invention, a cache memory includes multiple cache lines. The data field of the cache lines is divided into multiple sectors. A state-bit field is associated with each of the cache lines, and the state-bit field is utilized to identify at least four different states of the corresponding cache line. An inclusive-bit field is associated with each of the sectors within each cache lines, and the inclusive-bit field is utilized to identify an inclusivity state of an associated sector. A first of the four states is assigned to provide precise inclusivity states of an associated cache line. A second and a third of the four states is assigned to provide an imprecise inclusivity state of an associated cache line such that cache line state decoding is more efficient.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 depicts four examples of the pseudo-precise inclusivity scheme implementation in accordance with a preferred embodiment of the present invention.

DETAILED DESCRIPTION OF A PREFERRED EMBODIMENT

The present invention may be implemented in any data-processing system having a cache memory. Also, it is understood that the features of the present invention may be applicable in various data-processing systems having a primary cache and a secondary cache.

Figure 1:
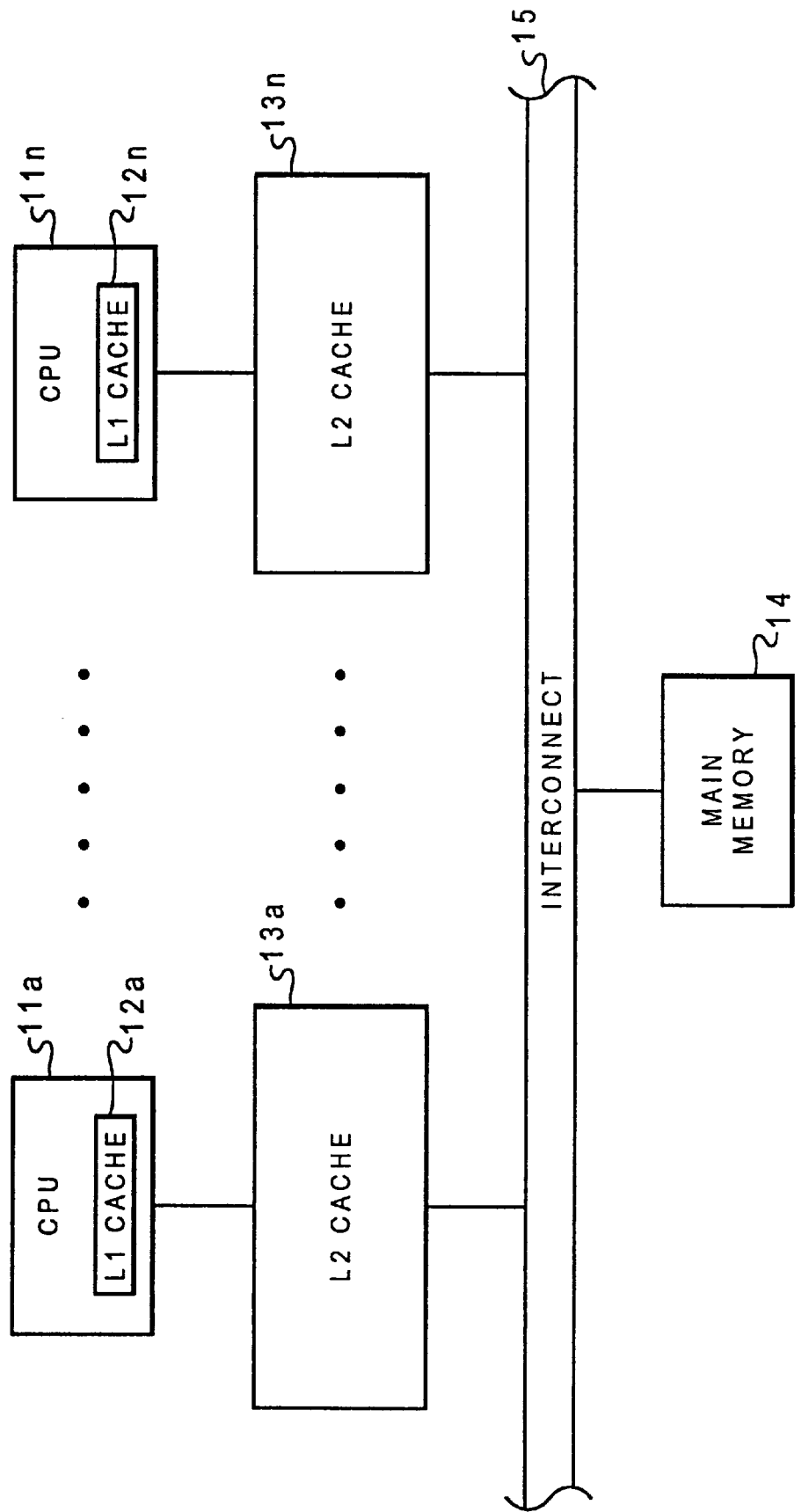
FIG. 1 is a block diagram of a data-processing system in which the present invention may be applicable.

Referring now to the drawings and in particular to FIG. 1, there is depicted a block diagram of a data-processing system 10 in which the present invention may be applicable. Data-processing system 10 includes multiple central processor units (CPUs) 11a–11n, and each of CPUs 11a–11n contains a primary cache. As shown, CPU 11a contains a primary cache 12a, while CPU 11n contains a primary cache 12n. Each of primary cache 12a–12n may be a sectored cache.

Each of CPUs 11a–11n, respectively, is coupled to each of secondary caches 13a–13n. As a preferred embodiment of the present invention, each of secondary caches 13a–13n is a sectored cache. CPUs 11a–11n, primary caches 12a–12n, and secondary caches 13a–13n are connected to each other through interconnect 15 to main memory 14. Interconnect 15 can be either a bus or a switch.

Although a preferred embodiment of a data-processing system is described in FIG. 1, it should be understood that the present invention can be practiced within a variety of system configurations. For example, each of CPUs 11a–11n may have multiple levels of cache memory. As another example, all secondary caches 13a–13n may be centralized to one component such that one secondary cache would serve as the only secondary cache for the entire data-processing system, instead of one for each primary cache as shown.

Figure 2:
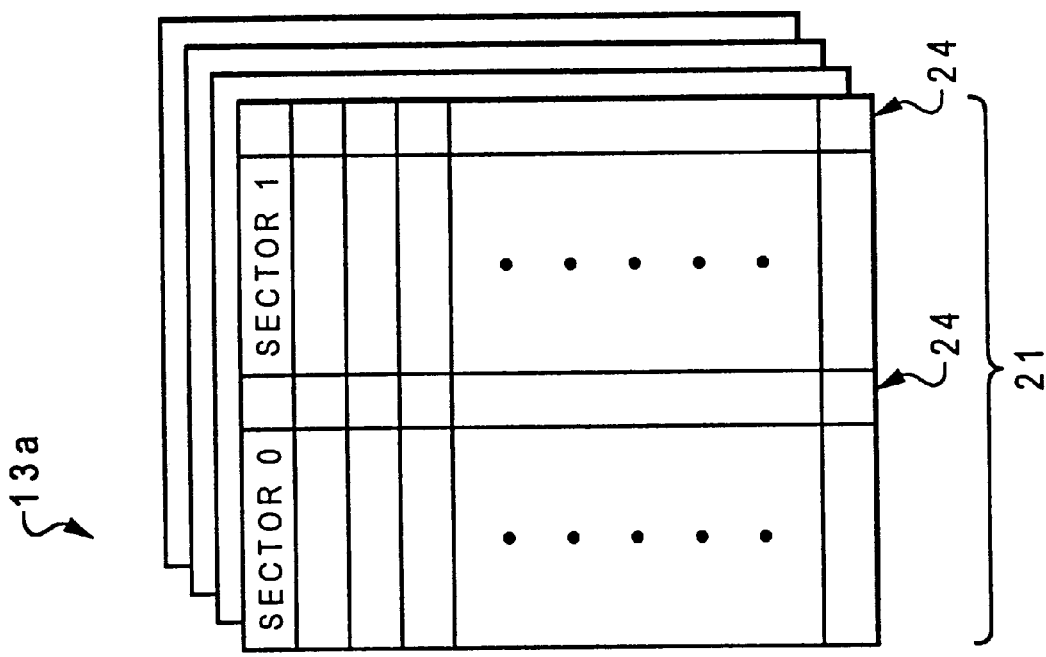
FIG. 2 is a block diagram of a secondary cache in accordance with a preferred embodiment of the present invention.
Figure 2:
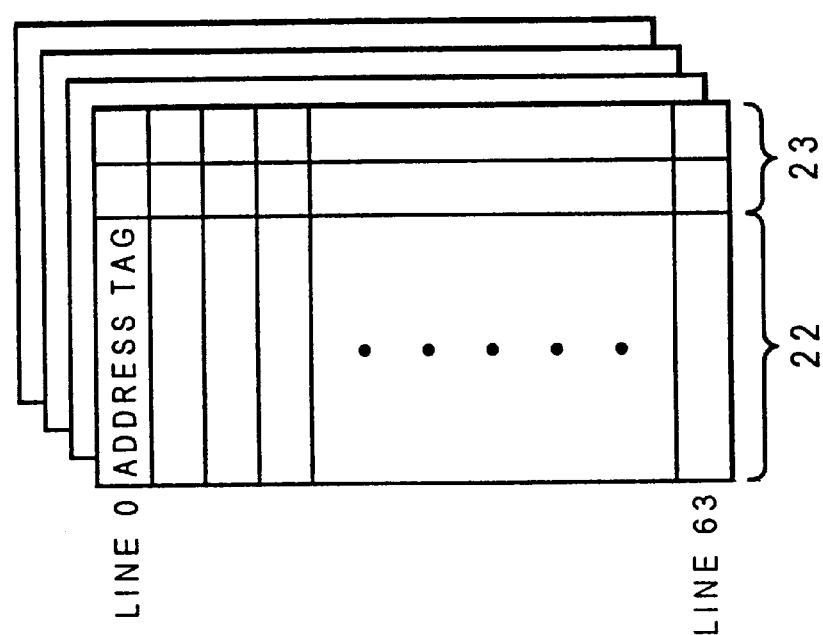

With reference now to FIG. 2, there is illustrated a block diagram of a secondary cache from FIG. 1, in accordance with a preferred embodiment of the present invention. As shown, secondary cache 13a is a four-way set-associative data cache. Each set has a total of 64 cache lines, and each cache line has a data field 21, an address tag field 22, and a state-bit field 23. As an example, data field 21 is divided into two sectors: sector 0 and sector 1, each sector preferably containing 64-bytes. Each sector within data field 21 further includes an inclusivity bit field 24.

Address tag field 22 and state-bit field 23 are preferably contained in a directory for secondary cache 13a. Although inclusivity bit fields 24, as shown, are positioned within data field 21, inclusivity bit fields 24 may also be contained within the directory. This directory may be organized under any caching scheme available, such as fully associative, direct-mapped, or set-associative, as is well-known in the art. A compare match of an incoming effective address with one of the tags within address tag field 22 indicates a cache "hit." The tag within address tag field 22 may be a full address for a fully associative directory, or a partial address for a direct-mapped directory or a set-associative directory. The bits within state-bit field 23 and inclusivity bit fields 24 are utilized to maintain cache coherency for the data-processing system of FIG. 1.

As an alternative embodiment, both status and inclusivity bit fields could be encoded into a single field within the directory.

The primary objective of a coherent memory system is to provide the same image of a memory location to all devices that are associated with the data-processing system. Coherency allows synchronization and cooperative usage of shared resources. Otherwise, multiple copies of a memory location, some containing stale values, could exist in the data-processing system, resulting in errors when the stale values are utilized.

Typically, a standard four-state MESI protocol is utilized to provide cache coherency for a data-processing system such as the one depicted in FIG. 1. MESI stands for a Modified (M) state, an Exclusive (E) state, a Shared (S) state, and an Invalid (I) state. The four-state MESI protocol preferably is implemented by a two-bit state-bit field 23 per cache line within secondary cache 13a, though a four-bit state-bit field for more efficient decoding also is acceptable.

Referring now to Table I, there is depicted all the inclusivity states for a two-sectored cache having a fully precise inclusivity scheme under the prior art. This scheme is implemented by utilizing two bits for the MESI state and one bit for the inclusivity state, per sector. Thus, a total of six bits is required under the prior art for a two-sectored cache.

TABLE I

| sector-0 | | sector-1 | |
|---|---|---|---|
| MESI state | L1 incl. state | MESI state | L1 incl. state |
| I | X | I | X |
| I | X | S | 0 |
| I | X | S | 1 |
| I | X | E | 0 |
| I | X | E | 1 |
| I | X | M | 0 |
| I | X | M | 1 |
| E | 0 | I | X |
| E | 1 | I | X |
| E | 0 | E | 0 |
| E | 0 | E | 1 |
| E | 1 | E | 0 |
| E | 1 | E | 1 |
| E | 0 | S | 0 |
| E | 0 | S | 1 |
| E | 1 | S | 0 |
| E | 1 | S | 1 |
| E | 0 | M | 0 |
| E | 0 | M | 1 |
| E | 1 | M | 0 |
| E | 1 | M | 1 |
| S | 0 | I | X |
| S | 1 | I | X |
| S | 0 | E | 0 |
| S | 0 | E | 1 |
| S | 1 | E | 0 |
| S | 1 | E | 1 |
| S | 0 | S | 0 |
| S | 0 | S | 1 |
| S | 1 | S | 0 |
| S | 1 | S | 1 |
| S | 0 | M | 0 |
| S | 0 | M | 1 |
| S | 1 | M | 0 |
| S | 1 | M | 1 |
| M | 0 | I | X |
| M | 1 | I | X |
| M | 0 | E | 0 |
| M | 0 | E | 1 |
| M | 1 | E | 0 |
| M | 1 | E | 1 |
| M | 0 | S | 0 |
| M | 0 | S | 1 |
| M | 1 | S | 0 |
| M | 1 | S | 1 |
| M | 0 | M | 0 |

TABLE I-continued

|  | sector-0 |  | sector-1 |
| --- | --- | --- | --- |
| MESI state | L1 incl. state | MESI state | L1 incl. state |
| M | 0 | M | 1 |
| M | 1 | M | 0 |
| M | 1 | M | 1 |

With reference now to Table II, all the inclusivity states are depicted for a two-sectored cache having a pseudo-precise inclusivity scheme, in accordance with a preferred embodiment of the present invention. This scheme is implemented by utilizing two bits for the MESI state per entire cache line and one bit for the inclusivity scheme per sector, within each cache line. Thus, as shown in FIG. 2, the state of all sectors within each cache line are represented by state bits within state-bit field 23. In addition, the inclusivity of each sector within a cache line is represented by an inclusivity bit within inclusivity bit field 24. Hence, a total of four bits is required for a two-sectored cache memory under the present invention.

TABLE II

| MESI STATE | sector 0 | sector 1 |
| --- | --- | --- |
| I | 0 | 0 |
| S | 0 | 0 |
| S | 1 | 1 |
| E | 0 | 0 |
| E | 1 | 1 |
| M | 0 | 0 |
| M | 0 | 1 |
| M | 1 | 0 |
| M | 1 | 1 |

Under the present invention, the inclusivity state of each sector is imprecise only when the cache line is in the S-11 state (line 3 of Table II) or E-11 state (line 5 of Table II). Otherwise, the cache line inclusivity state of each sector is precise.

Still referring to Table II, in the E-11 state, sector 0 and/or sector 1 is only allowed to be in Invalid or Shared state in the L1 (higher-level) cache. The reason for preventing the L1 cache from entering the Exclusive state is because it is desirable if the L1 cache always notifies the L2 cache any time it needs to modify a previously unmodified sector. If the L1 cache were allowed to transition to the Exclusive state when the L2 cache is in the Exclusive state and the L1 cache then stored into that sector, coherency protocols do not require the L1 cache to notify the L2 cache that it is transitioning from the Exclusive to the Modified state. By preventing the L1 cache from transitioning to the Exclusive state when the L2 cache is in the Exclusive state, the L2 cache controller logic is simplified because, in the Exclusive state, the cache controller logic knows for sure that the L1 cache will not push any modified data back down to the L2 cache due to a snoop invalidate operation or an Least Recently Used (LRU) deallocation from the L2 cache. In the Modified cache state in which at least one inclusivity bit is set, the L2 cache controller always assumes the sector(s) could be modified in the L1 cache.

Referring now to FIG. 3, four examples of the pseudo-precise inclusivity scheme implementation in accordance with a preferred embodiment of the present invention are depicted. In the first example, cache line A is marked "Modified" by the state bits (within state-bit field 23 of FIG. 2) and the inclusivity bit for its sector 1 is set. This means sector 1 could be in one of the Modified, Exclusive, or Shared state in the higher-level cache. Sector 0 is not resident in the higher-level cache.

In the second example, cache line B is marked as "Exclusive" in the state-bit field and both inclusivity bits are off. This means that neither sector is resident in the higher-level cache (precise inclusivity).

In the third example, cache line C is marked as "Shared" in the state-bit field, and the inclusivity bits for both sector 0 and sector 1 are set. This means sector 0 and/or sector 1 could be in the Shared state in the higher-level cache (imprecise inclusivity).

In the forth example, cache line D is marked as "Invalid" in the state-bit field. This means both sector 0 and 1 are Invalid in the higher-level cache.

As has been described, the present invention provides a method of providing a pseudo-precise inclusivity scheme in a sectored cache memory for maintaining cache coherency within a data-processing system. Although only a two-sectored secondary cache is utilized to illustrate the present invention, it is understood by those skilled in the art that the pseudo-precise inclusivity scheme is applicable to any multi-sectored cache coupled to at least one higher-level cache.

The pseudo-precise inclusivity scheme under the present invention requires a fewer number of bits to encode the states of a cache line as compared to the prior art. It is easier to decode (for higher frequencies) and it frees up decodes for other additional states, if required, without the addition of extra state bits. This implementation reduces the overall number of directory state bits per cache line, and allows smaller static-memory arrays to be utilized which, in turn, contributes to a smaller chip size and faster array-access times.

Other benefits of the present invention include logic simplification without sacrificing performance. For example, in the cases where a higher-level cache may have a sector modified (i.e., M-01, M-10, or M-11), if a back invalidate is required to invalidate the cache line due to a snoop invalidation or an LRU deallocation, the invalidating operation communicated to the higher-level cache will likely result in the cache writing (pushing) the modified data back to the higher-level cache. The sequence can take several clock cycles to complete. Therefore, it is not desirable to waste extra time to issue a back invalidate operation to a sector that is not resident in the higher-level cache (i.e., precision is needed here for optimal performance).

In the Shared and Exclusive states as defined in this invention, if a back invalidate is required, again to invalidate the cache line due to a snoop invalidation or an LRU deallocation, it is certain that the primary cache will not contain the modified data. Therefore, the penalty for issuing a back invalidate to a sector that never was resident in the primary cache is negligible (i.e., the imprecision here has negligible performance impact because the back invalidates can be performed in parallel with other actions without having first wait to see if the higher-level cache is going to push modified data).

While the invention has been particularly shown and described with reference to a preferred embodiment, it will be understood by those skilled in the art that various changes in form and detail may be made therein without departing from the spirit and scope of the invention.

What is claimed is:

1. A method of providing a pseudo-precise inclusivity scheme for maintaining cache coherency within a data-processing system having at least an upper-level cache and a lower-level cache, said method comprising the steps of:

dividing a data field of each of a plurality of cache lines within said lower-level cache into a plurality of sectors;

associating each of said plurality of sectors within each cache line with a respective one of a plurality of inclusive-bit fields, wherein each of said inclusive-bit fields is utilized to identify an inclusivity state for its associated sector; and associating each of said plurality of cache lines within said lower-level cache with a respective single one of a plurality of state-bit fields, wherein each of said state-bit fields is utilized to identify only one of at least three possible states for all of said plurality of sectors within each of the associated is cache lines.

2. The method according to claim 1, wherein said at least three states further includes a Modified state, a Shared state, and an Invalid state.

3. The method according to claim 1, wherein said first of said at least three states is a Modified state.

4. The method according to claim 1, wherein said second of said at least three states is an Invalid state.

5. The method according to claim 1, wherein said third of said at least three states is a Shared state.

6. A sectored-cache memory having a pseudo-precise inclusivity scheme for maintaining cache coherency between an upper-level cache and a lower-level cache, said sectored-cache memory comprising:

a plurality of cache lines within said lower-level cache having a respective data field divided into a plurality of sectors;

a plurality of inclusive-bit fields, wherein each of said plurality of sectors with each cache line is associated with a respective one of said plurality of inclusive-bit fields, wherein each of said plurality of inclusive-bit fields is utilized to identify an inclusivity state for its associated sector; and each of said plurality of cache lines within said lower-level cache is associated with a respective single one of a plurality of state-bit fields, wherein each of said state-bit fields is utilized to identify only one of at least three possible states for all of said plurality of sectors within each of the associated cache lines.

7. The sectored-cache memory according to claim 6, wherein said at least three states further includes a Modified state, a Shared state, and an Invalid state.

8. The sectored-cache memory according to claim 6, wherein said first of said at least three states is a Modified state.

9. The sectored-cache memory according to claim 6, wherein said second of said at least three states is an Invalid state.

10. The sectored-cache memory according to claim 6, wherein said third of said at least three states is a Shared state.

11. A data-processing system comprising:

a processor;

a system memory coupled to said processor;

an upper-level cache memory included within said processor;

a lower-level sectored-cache memory having a pseudo-precise inclusivity scheme for maintaining cache coherency within said upper-level cache memory within said processor, wherein said lower-level sectored-cache memory includes:

a plurality of cache lines having a respective data field divided into a plurality of sectors;

a plurality of inclusive-bit fields, wherein each of said plurality of sectors with each cache line is associated with a respective one of said plurality of inclusive-bit fields, wherein each of said plurality of inclusive-bit fields is utilized to identify an inclusivity state for its associated sector; and each of said plurality of cache lines within said lower-level cache is associated with a respective single one of a plurality of state-bit fields, wherein each of said state-bit fields is utilized to identify only one of at least three possible states for all of said plurality of sectors within each of the associated cache lines.

12. The data-processing system according to claim 11, wherein said at least three states further includes a Modified state, a Shared state, and an Invalid state.

13. The data-processing system according to claim 11, wherein said first of said at least three states is a Modified state.

14. The data-processing system according to claim 11, wherein said second of said at least three states is an Invalid state.

15. The data-processing system according to claim 11, wherein said third of said at least three states is a Shared state.

* * * * *

UNITED STATES PATENT AND TRADEMARK OFFICE
CERTIFICATE OF CORRECTION

PATENT NO. : 6,115,794
DATED : September 5, 2000
INVENTOR(S) : Arimilli, et al.

It is certified that error appears in the above-identified patent and that said Letters Patent is hereby corrected as shown below:

In Col. 7, line 18, please delete "is".

Signed and Sealed this

Eighth Day of May, 2001

Attest:

NICHOLAS P. GODICI

Attesting Officer

Acting Director of the United States Patent and Trademark Office